United States Patent
Cordell (10) Patent No.: US 11,205,189 B2
(45) Date of Patent: Dec. 21, 2021

(54) SYSTEM AND METHOD FOR PRIORITIZING CONTENT BASED ON AUTOMOBILE-USAGE PATTERNS

(71) Applicant: Xevo Inc., Bellevue, WA (US)

(72) Inventor: John P. Cordell, Seattle, WA (US)

(73) Assignee: XEVO INC., Bellevue, WA (US)

( * ) Notice: Subject to any disclaimer, the term of this patent is extended or adjusted under 35 U.S.C. 154(b) by 130 days.

(21) Appl. No.: 16/266,222

(22) Filed: Feb. 4, 2019

(65) Prior Publication Data

US 2020/0250696 A1     Aug. 6, 2020

(51) Int. Cl.
- *G06Q 30/00* (2012.01)
- *G06Q 30/02* (2012.01)
- *G07C 5/00* (2006.01)
- *G07C 5/08* (2006.01)

(52) U.S. Cl.
CPC ..... *G06Q 30/0224* (2013.01); *G06Q 30/0266* (2013.01); *G07C 5/008* (2013.01); *G07C 5/0841* (2013.01)

(58) Field of Classification Search
None
See application file for complete search history.

(56) References Cited

U.S. PATENT DOCUMENTS

| | | | | |
|---|---|---|---|---|
| 2002/0084891 A1* | 7/2002 | Mankins | ............... | B60Q 1/2611 340/425.5 |
| 2008/0248815 A1* | 10/2008 | Busch | ................... | H04W 4/025 455/456.5 |
| 2014/0324510 A1* | 10/2014 | Vardhan | ........... | G06Q 10/06314 705/7.24 |
| 2015/0206181 A1* | 7/2015 | Parundekar | ........ | G06Q 30/0265 705/14.49 |
| 2017/0299402 A1* | 10/2017 | Hansen | ................. | H04W 4/024 |
| 2019/0102840 A1* | 4/2019 | Perl | ........................ | B60W 40/09 |

* cited by examiner

*Primary Examiner* — Michael W Schmucker
(74) *Attorney, Agent, or Firm* — Seed IP Law Group LLP (57) ABSTRACT

Embodiments are directed towards providing a system that presents customized content to a user in an automobile based on the usage patterns of the automobile or its current occupant. Accessory data from the automobile is monitored to learn the automobile-usage patterns. The automobile-usage patterns are mapped to a plurality of content items, such as by mapping the content items to services, which are then mapped to the automobile-usage patterns. The plurality of content items are prioritized for display to the user based on the automobile-usage patterns and the frequency of those automobile-usage patterns. The prioritized content items can be presented to the user sequentially or in response to accessory data that matches an automobile-usage pattern.

17 Claims, 7 Drawing Sheets

| Priority | Automobile-Usage Pattern | Service | Content Item |
|---|---|---|---|
| 1 | - 25% < Gas tank amount < 50%<br>- Get gas next time drive by XYZ Gas station | Gas - XYZ Gas Station | Map icon of nearest XYZ Gas Station |
| 2 | - Gas tank amount < 25%<br>- Get gas next station | Gas - any | Coupon for nearest gas station |
| 3 | - Time of day = 11:00 am - 1:00 pm on Fridays<br>- Stop at Restaruant MNO | Food - Restaurant MNO | Coupon for Restaurant MNO |
| 4 | - Time of day = 11:00 am - 1:00 pm on Mondays<br>- Stop at Mall EFG | Shopping - Mall EFG | Alert for store sales at Mall EFG |
| 5 | - Turn ignition on<br>- In parking lot of SuperStore<br>- Wait time for gas < 3 minutes<br>- Gas tank < 60%<br>- Get gas 80% of the time | Gas - SuperStore gas | Alert no wait time at SuperStore gas |
| 6 | - Turn ignition on<br>- In parking lot of SuperStore<br>- 3 minutes < Wait time for gas < 7 minutes<br>- Gas tank < 60%<br>- Get gas 20% of the time | Gas - SuperStore gas | Coupon for SuperStore gas |

Rows labeled 210a, 210b, 210c, 210d, 210e, 210f. Columns labeled 202, 204, 206, 208. Figure 200A.

FIG. 1

| Priority | Automobile-Usage Pattern | Service | Content Item |
|---|---|---|---|
| 1 | - 25% < Gas tank amount < 50%<br>- Get gas next time drive by XYZ Gas station | Gas - XYZ Gas Station | Map icon of nearest XYZ Gas Station |
| 2 | - Gas tank amount < 25%<br>- Get gas next station | Gas - any | Coupon for nearest gas station |
| 3 | - Time of day = 11:00 am - 1:00 pm on Fridays<br>- Stop at Restaruant MNO | Food - Restaurant MNO | Coupon for Restaurant MNO |
| 4 | - Time of day = 11:00 am - 1:00 pm on Mondays<br>- Stop at Mall EFG | Shopping - Mall EFG | Alert for store sales at Mall EFG |
| 5 | - Turn ignition on<br>- In parking lot of SuperStore<br>- Wait time for gas < 3 minutes<br>- Gas tank < 60%<br>- Get gas 80% of the time | Gas - SuperStore gas | Alert no wait time at SuperStore gas |
| 6 | - Turn ignition on<br>- In parking lot of SuperStore<br>- 3 minutes < Wait time for gas < 7 minutes<br>- Gas tank < 60%<br>- Get gas 20% of the time | Gas - SuperStore gas | Coupon for SuperStore gas |

*FIG. 2A*

| Priority | Automobile-Usage Pattern | Service | Content Item |
|---|---|---|---|
| 2 | - 25% < Gas tank amount < 50%<br>- Get gas next time drive by XYZ Gas station | Gas - XYZ Gas Station | Map icon of nearest XYZ Gas Station |
| 3 | - Gas tank amount < 25%<br>- Get gas next station | Gas - any | Coupon for nearest gas station |
| 1 | - Time of day = 11:00 am - 1:00 pm on Fridays<br>- Stop at Restaruant MNO | Food - Restaurant MNO | Coupon for Restaurant MNO |
| 6 | - Time of day = 11:00 am - 1:00 pm on Mondays<br>- Stop at Mall EFG | Shopping - Mall EFG | Alert for store sales at Mall EFG |
| 4 | - Turn ignition on<br>- In parking lot of SuperStore<br>- Wait time for gas < 3 minutes<br>- Gas tank < 60%<br>- Get gas 80% of the time | Gas - SuperStore gas | Alert no wait time at SuperStore gas |
| 5 | - Turn ignition on<br>- In parking lot of SuperStore<br>- 3 minutes < Wait time for gas < 7 minutes<br>- Gas tank < 60%<br>- Get gas 20% of the time | Gas - SuperStore gas | Coupon for SuperStore gas |

If current time is 12:05 pm on a Friday and gas tank is less than 70% full

*FIG. 2B*

| Priority | Automobile-Usage Pattern | Service | Content Item |
|---|---|---|---|
| 4 | - 25% < Gas tank amount < 50%<br>- Get gas next time drive by XYZ Gas station | Gas - XYZ Gas Station | Map icon of nearest XYZ Gas Station |
| 1 | - Gas tank amount < 25%<br>- Get gas next station | Gas - any | Coupon for nearest gas station |
| 6 | - Time of day = 11:00 am - 1:00 pm on Fridays<br>- Stop at Restaruant MNO | Food - Restaurant MNO | Coupon for Restaurant MNO |
| 3 | - Time of day = 11:00 am - 1:00 pm on Mondays<br>- Stop at Mall EFG | Shopping - Mall EFG | Alert for store sales at Mall EFG |
| 2 | - Turn ignition on<br>- In parking lot of SuperStore<br>- Wait time for gas < 3 minutes<br>- Gas tank < 60%<br>- Get gas 80% of the time | Gas - SuperStore gas | Alert no wait time at SuperStore gas |
| 5 | - Turn ignition on<br>- In parking lot of SuperStore<br>- 3 minutes < Wait time for gas < 7 minutes<br>- Gas tank < 60%<br>- Get gas 20% of the time | Gas - SuperStore gas | Coupon for SuperStore gas |

If current time is 11:05 am on a Monday and turn on ignition in parking lot of SuperStore with a gas tank that is 20% full and the wait time at SuperStore gas is 2 minutes.

SYSTEM AND METHOD FOR PRIORITIZING CONTENT BASED ON AUTOMOBILE-USAGE PATTERNS

TECHNICAL FIELD

The present disclosure relates generally to the dynamic prioritization and presentation of content to a person in an automobile based on usage patterns of the automobile.

BACKGROUND

Description of the Related Art

Automobiles are becoming more and more user friendly and interactive. Many new cars are now manufactured with a user interface, called a head unit, which a user can use to control various aspects of the automobile and access a variety of content or applications. For example, the user can use the head unit to change radio stations, change the temperature of the automobile cabin, access maps and global positioning systems, access the internet, access other head-unit applications, or access or control other accessories of the automobile. The head unit can also provide various types of information or content to the user, such as when the automobile is due for an oil change or when a tire rotation should be performed, to name a few.

BRIEF SUMMARY

Briefly stated, embodiments are directed towards a system and method of presenting customized content to a user in an automobile based on usage patterns of the automobile. A plurality of automobile accessories are monitored for accessory data, such as time of day, current location, fuel tank level, speed, etc. A plurality of automobile-usage patterns are generated from the accessory data. These automobile-usage patterns can indicate when a user of the automobile gets gas, when or where they stop for food, commute times, does the user drive with the windows down, etc., just to name a few.

The automobile-usage patterns are mapped to a plurality of content items based on same or similar services, such as gas, food, clothing, shopping, work, or particular store names. A few examples of content items can include directions to a particular store or location, icons for a navigation map, coupons, advertisements, hours of operation, safety information, etc. The content items can be prioritized or ranked based on a frequency in which the corresponding automobile-usage patterns are identified as being performed. The content items can be continuously re-prioritized or re-ranked based on current accessory data. For example, if the gas tank is getting low, content items associated with gas or gas stations may be prioritized or ranked above content items associated with clothing stores.

Content items from the prioritized or ranked list can then be presented to the user of the automobile based on their respective priority, such as only presenting a highest priority or highest ranking content item, presenting a higher priority or higher ranking content item more prominently on the head unit display than a lower priority or lower ranking content item, presenting a higher priority or higher ranking content item via visual and audible output rather than just visual as done for a lower priority or lower ranking content item, etc. In this way, the content provided to the user can dynamically change based on the current and historic usage of the automobile.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The term "user" refers to a person or occupant that is in a vehicle or in control of the vehicle. The user may be the driver or a passenger or operator of the vehicle. The term "content" refers to information that can be presented to a user of the vehicle. Content may include visual content, audio content, tactile content, or some combination thereof. Visual content can include, but is not limited to, text, graphics, symbols, video, or other information that is displayed to a user on a display device. Audio content can include, but is not limited to, songs, vocals, music, chimes, or other types of sounds that are provided to a user via a speaker. Tactile content can include, but is not limited to, vibrations, pulses, or other types of touch-based sensations provided to the user via a haptic interface. Generalized types of content can include representations that are related (but are not limited) to advertisements, sports scores or information, directions, restaurant menus, coupons, descriptive information, emergency instructions, etc.

The term "vehicle" is defined as a device used to transport people or goods (or both), and examples include automobiles, buses, aircraft, boats, or trains. Although most of the following text focuses on an automobile, the application of the concepts described herein is not limited to such a vehicle. A "processor" is defined as a component with at least some circuitry or other hardware that can execute instructions. An "accessory" is defined as a device that receives, captures, or detects one or more parameters associated with the operation or state of a vehicle and presents such information to another device or in a form that is recognizable to a human.

The term "automobile-usage pattern" is defined as a trait, behavior, or other observable characteristic associated with the operation of an automobile (or other vehicle) that is repeated one or more times with respect to a certain set of criteria or establishes a basis for predicting its occurrence in the future. The term "mapping" is defined as a data set in which at least some of the components of the data set are linked by (1) a relationship based on one or more criteria or (2) observed behavior. The term "prioritize" is defined as to determine the order of a series of items according to their relative importance or applicability. The term "service" is defined as a data component or a designation that identifies a category of goods, services, or other commercial offerings or specific instances of such goods, services, or other commercial offerings.

Figure 1:
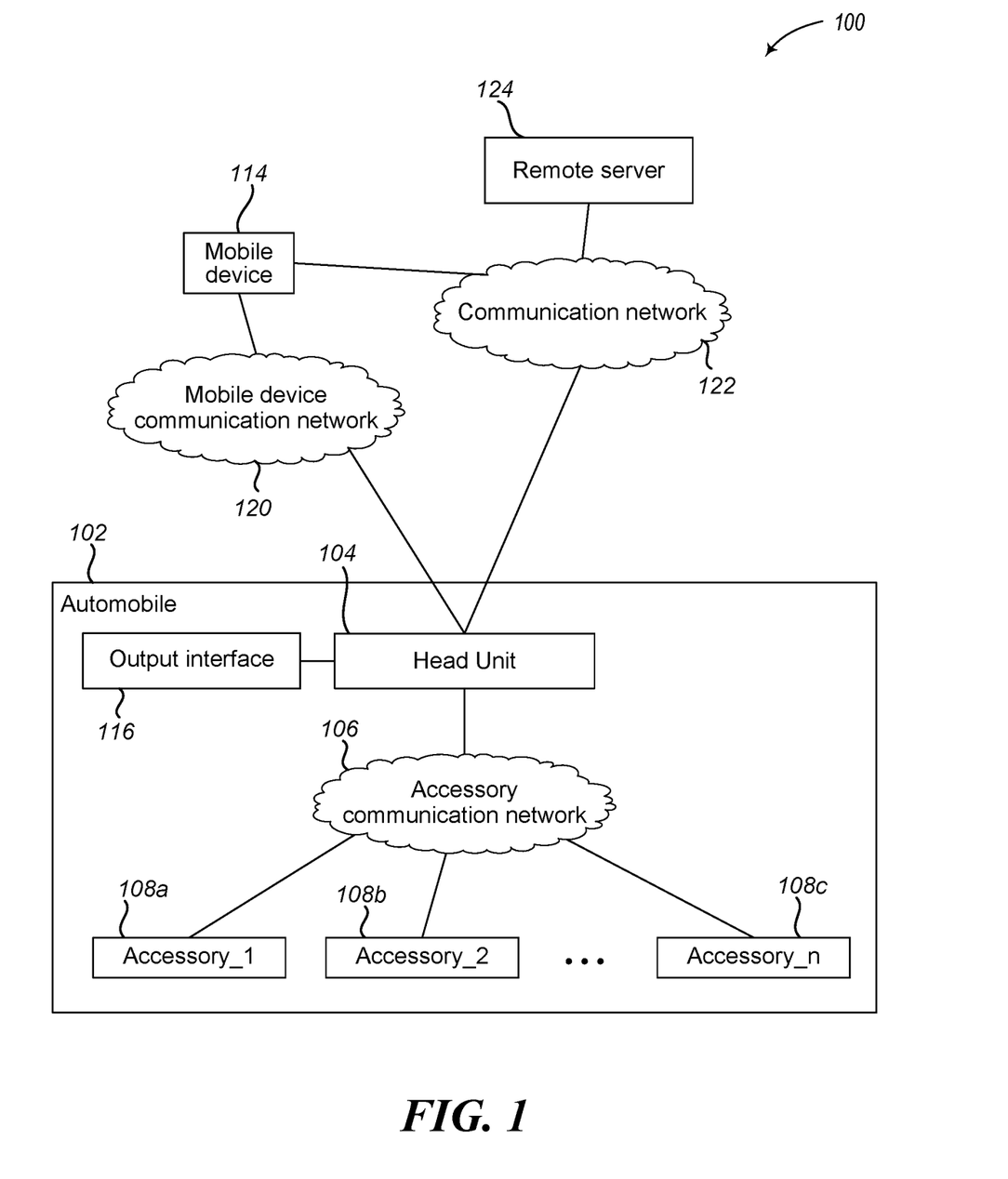
FIG. 1 illustrates a context diagram of an automobile environment that monitors automobile accessories to generate automobile-usage patterns and prioritize respective content to be presented to the user in accordance with embodiments described herein.

FIG. 1 illustrates a context diagram of an automobile environment that monitors automobile accessories to generate automobile-usage patterns and prioritize respective content to be presented to the user in accordance with embodiments described herein.

System 100 includes an automobile 102 that has a head unit 104, an output interface 116, and one or more accessories 108a-108c. The output interface 116 provides content to a user of the automobile 102. In the illustrative examples described herein, a computing device of the automobile 102 is the head unit 104, although other types of computing devices may be employed. Moreover, although this description primarily refers to automobiles, similar embodiments may also be employed in aerial vehicles, water vessels, railroad vehicles, and other modes of transportation.

The head unit 104 is a computing device that provides content, interactive controls, user interfaces, or other information to users of the automobile 102. As an illustrative example, the head unit 104 may provide a navigation interface, audio and radio controls, environmental controls, automobile performance or maintenance information, or other types of content.

The head unit 104 is configured to access or receive information or control use of the one or more accessories 108a-108c. The accessories 108a-108c can be virtually any automobile utility or device that provides information or data to the user. Examples of these accessories include, but are not limited to, gas-tank-level gauge, speedometer, odometer, oil-pressure gauge, temperature gauge, tire-pressure gauge, GPS location, ignition status, gear-shift mechanics or electronics indicating a gear state or change of state, seat-belt-click state, seat-weight sensors, a clock having a time of day or day of the week, navigation-system state or operation, or other automobile sensors that provide information to a user of the automobile. Accessories 108a-108c may also be applications executing on the head unit 104 that provide information to the user or have two-way interactions with the user. Examples of these accessories include, but are not limited to, navigation, audio and radio controls, television or music applications, environmental-control applications, automobile-performance or maintenance applications, or other applications.

Accessories 108a-108c may also provide information from other sources. For example, in some embodiments, the accessories 108a-108c may provide "derived accessory data" from internal-facing or external-facing cameras or other input devices. Derived accessory data is information about an environment associated with the automobile that can provide additional details or aspects of automobile-usage pattern detection, as described herein. For example, images from a camera on the automobile may be analyzed to determine which user is in the automobile, which user is operating the automobile, where the driver or other user is looking (e.g., whether they are talking to a passenger), whether there are pedestrians nearby, whether there are billboards or store signs next to the road or automobile, etc.

In other embodiments, one or more of the accessories 108a-108c may be "ephemeral accessories" or provide "ephemeral accessory data." Ephemeral accessory data is information that is provided by another electronic device associated with a user in the automobile. For example, a person in the automobile may have a mobile phone that includes web or application browsing or usage history or a calendar with appointment dates, times, locations, and phone numbers of participants. This information can be utilized herein similar to other accessory data to identify patterns or determine what content is to be provided to the user. For example, if a pattern is identified that a driver typically stops for coffee on the way to work, but the driver is running late for a meeting or some other event, then the system can determine that the driver is less likely to stop for coffee. As a result, they system may not select content associated with coffee, but rather provide content to the driver enabling the driver to "call into the meeting" or otherwise engage the event in some way from the automobile.

In some embodiments, one or more of the accessories 108a-108c may also be an automobile utility or device that is controllable by a user. Examples of these accessories include, but are not limited to, adjustable seats, sun roof, side mirrors, rear-view mirror, air conditioner, power windows, or other controllable features of the automobile 102.

It should be noted that some accessories may only output data, some accessories may only receive controls to manipulate the accessory, and some accessories may input and output data. For example, a speedometer may only output the current speed of the automobile; a power window may only receive controls to move the window up or down, but not return any information to the head unit; and the navigation system may receive controls for a destination and also return a suggested travel route to the destination. It should be further noted that these examples are non-exhaustive and other types of accessories may also be employed.

The head unit 104 can communicates with the accessories 108a-108c via an accessory communication network 106. The accessory communication network 106 is configured to couple the accessories 108a-108c with the head unit 104 to transmit content/data between the accessories 108a-108c and the head unit 104. The information communicated between devices may include current accessory status or data, accessory control data, video data, voice data, image data, text data, or other types of content, data, or information. The accessory communication network 106 may include one or more physical networks, one or more wireless communication networks, one or more application program interfaces, or one or more other networks capable of transmitting data from one accessory to another, from an accessory to the head unit 104, or from the head unit 104 to an accessory, or some combination thereof depending on the types of accessories communicating with the head unit 104. For example, the accessory communication network 106 may include an automotive body communication network, such as a wired controller area network, short range wireless communication network, such as personal area networks utilizing Bluetooth Low Energy protocols, or any other type of network.

The head unit 104 monitors the accessories 108a-108c by accessing or receiving accessory data over time. As described herein, one or more machine learning techniques may be employed to generate or identify automobile-usage patterns from the monitored accessory data. The automobile-usage patterns are mapped to content items based on common services associated with both the automobile-usage patterns and the content items.

In various embodiments, one or more statistical models may also be employed to determine the frequency of the automobile-usage patterns and a likelihood that the automobile-usage pattern will occur again in the future. This information is used to prioritize the content items for presentation to the user. As additional automobile accessory data is monitored and received, it is compared to the automobile-usage patterns to determine if the user is likely to be interested in content items associated with automobile-usage patterns that match the received accessory data. In various embodiments, the content items are re-prioritized based on the received accessory data such that content items associated with automobile-usage patterns that match or partially match the received accessory data are presented to the user with higher priority than other content items. Confidence factors may also be assigned to the matches (or partial matches) and considered as part of prioritizing the content items. One or more of the re-prioritized content items are then presented to the user via output interface 116 based on that priority.

In one arrangement, the head unit 104 may be programmed with one or more machine learning ("ML") models, and the head unit 104 can be configured to perform the analysis described above. In addition, the automobile 102 may be equipped with an onboard computer (not shown) loaded with one or more ML models and designed to carry out these functions. In such an example, the onboard computer is communicatively coupled to the head unit 104, such as through the accessory communication network 106, which also enables it to receive data from the accessories 108a-108c.

In yet another embodiment, the automobile 102 may exchange data with a remote server 124 over a communication network 122. The remote server 124 may be loaded with one or more ML models, which can process the operational and usage data from the automobile 102. Improvements in the ML models of the remote server 124 may be fed to any ML models on the head unit 104 or onboard computer of the automobile 102 to enable these local models to receive the benefit of such remote processing. The automobile 102 may rely on any wireless system for connections with the communication network 122, such as a data communications module ("DCM") in the head unit 104 or a user's mobile device 114. The head unit 104 can also communicate with the mobile device 114 over the mobile-device communication network 120.

The output interface 116 is an interface that is configured to output content to a user of the automobile 102. The output interface 116 may include a visual interface, such as a display device, an audio output interface, such as a speaker, a haptic interface, such as a tactile output device, or a combination thereof. Therefore, the output interface 116 is configured to output visual content, audio content, tactile content, or some combination thereof. In some embodiments, the output interface 116 or a portion thereof may be separate from or independent of the head unit 104. In other embodiments, the output interface 116 or a portion thereof may be included in or embedded with the head unit 104. For example, the head unit 104 may include a built-in display device as one component of the output interface 116 and a separate speaker that is external to the head unit 104 as another component of the output interface 116.

As mentioned herein, output of content based on priority may include presenting the content via different output interfaces. For example, higher priority content may be output via output interface 116 as audio content, whereas lower priority content may be displayed on a display device of head unit 104. In other embodiments, one or more of the prioritized content items may be presented on a same output interface 116, but at different times, at different rates, or at different levels of prominence, etc.

In one embodiment, the manner of presentation may comply with distracted-driver guidelines or regulations, laws, or other requirements related to driver or vehicle safety. Examples of guidelines include those established by vehicle manufacturers (individually or as a group) or the US National Highway Traffic Safety Administration (or some other US or foreign government agency or a standards-setting organization). Examples of regulations or laws include those promulgated by federal or state governments, such as the regulations of the Federal Motor Vehicles Safety Standards, or foreign governments or organizations. Additional information on this topic will be presented below.

In various embodiments and as previously noted, the head unit 104 may be configured to communicate with other computing devices, such as mobile device 114 or remote server 124. For example, the head unit 104 may receive content from the remote server 124 via communication network 122, which the head unit 104 can output via the output interface 116. Such content may be associated with objects that are identified as being looked at by the user, as described herein.

In various embodiments, the head unit 104 performs the processing of accessory information captured by the accessories 108a-108c to generate automobile-usage patterns, as described herein. In at least one embodiment, the automobile-usage pattern generation may be performed by another computing device on the automobile 102 or by a remote computing device that is separate from the automobile 102, such as mobile device 114 or remote server 124. Likewise, in some embodiments, the head unit 104 or another onboard computer performs the content prioritization and selection described herein. In other embodiments, the mobile device 114 or the remote server 124, or some other computing device, may perform the content prioritization and selection. Accordingly, the functionality described herein with respect to generating automobile-usage patterns, prioritizing content based on those patterns, and presenting the prioritized content to the user of the automobile may be performed by the head unit 104, an onboard computer, the remote server 124, the mobile device 114, or some combination thereof.

For example, the head unit 104 may analyze the accessory information and generate the automobile-usage patterns and send a request for content to the remote server 124. In response, the remote server 124 may return content to the head unit 104. The head unit 104 can prioritize the content based on the generated automobile-usage patterns and output the content via the output interface 116, as described herein.

As another example, the head unit may send the automobile-usage patterns to the mobile device 114 or the remote server 124 along with the request for content. In response, the mobile device 114 or the remote server 124 may map content to the received automobile-usage patterns. The mobile device 114 or the remote server 124 may then send the prioritized content to the head unit 104, or they may select content for presentation to the user and send the selected content to the head unit 104 for presentation to the user via output interface 116.

As another example, the head unit 104 may collect accessory information from the plurality of accessories 108a-108c and provide it to the mobile device 114 or the remote server 124. The mobile device 114 or the remote server 124 may perform the automobile-usage pattern processing described herein. In some embodiments, the mobile device 114 or the remote server 124 may return the automobile-usage patterns to the head unit 104 for the head unit to prioritize and present content to the user. In other embodiments, the mobile device 114 or the remote server 124 may perform the content-prioritization functionality described herein. In this case, the mobile device 114 or the remote server 124 may send the prioritized content to the head unit 104, or they may select particular prioritized content and send the selected content to the head unit 104 for presentation to the user via output interface 116.

In at least one embodiment, the mobile device 114 acts as an intermediate device between the head unit 104 and the remote server 124. In this way, the mobile device 114 may forward the accessory information or automobile-usage patterns from the head unit 104 to the remote server 124 for processing or forward the automobile-usage patterns or prioritized content from the remote server 124 to the head unit 104. In some other embodiments, the mobile device 114 may display the prioritized content to the user on a display device of the mobile device 114. Accordingly, in some embodiments, the head unit 104 or the remote server 124 may provide the prioritized content to the mobile device 114 for display on the mobile device 114. In another arrangement, the mobile device 114 may receive content from the remote server 124 or some other device or system and project the content to the head unit 104 for display on the head unit 104, with accompanying audio to be played over speakers of the automobile 102.

In some embodiments, the remote server 124, the head unit 104, and the mobile device 114 communicate with each other via the communication network 122. The communication network 122 is configured to couple various computing devices to transmit data from one or more devices to one or more other devices. Communication network 122 includes various wireless networks that may be employed using various forms of communication technologies and topologies, such as, but not limited to, cellular networks, mesh networks, or the like. The mobile device communication network 120, the communication network 122, and the accessory communication network 106 may be separate communication networks, as illustrated, or some of them may form part of the same communication network or at least share network components.

In various embodiments, the head unit 104 communicates with the mobile device 114 via the mobile device communication network 120. The mobile device communication network 120 is configured to couple the mobile device 114 with the head unit 104 to transmit content/data between the mobile device 114 and the head unit 104. The information communicated between devices may include current accessory status or data, requests to access accessory data, requests to control or modify an accessory, video data, voice data, image data, text data, or other types of content, data, or information. The communication network 120 may comprise one or more short-range wireless communication networks, such as personal-area networks utilizing classic Bluetooth or Bluetooth Low Energy protocols, or an IR optical network to enable communication between the mobile device 114 and the head unit 104.

In some other embodiments, the head unit 104 may act as an intermediate device that facilitates communication between the mobile device 114 and the accessories 108a-108c. In this way, the head unit 104 can act as a gateway between the mobile device 114 and the accessories 108a-108c to provide authentication and authorization for permitting or restricting the control of accessories 108a-108c and the transfer of accessory information, which can enable a user to access information from or control accessories 108a-108c via mobile device 114.

The remote server 124 is any combination of computing devices, such as one or more servers or other cloud resources, which is remote to the automobile 102 and can provide content or other information to the head unit 104 or the mobile device 114. Although the remote server 124 is illustrated as a single device, embodiments are not so limited. Rather, the remote server 124 may be one or more computer devices that perform one or more functions.

The mobile device 114 includes any device capable of communicating with a head unit 104 of the automobile 102 or remote server 124. The mobile device 114 is configured and structured to send and receive information, content, or controls to and from the head unit 104 or the remote server 124. Examples of the mobile device 114 include, but are not limited to, laptop computers, smart phones, tablet computers, wearable computing devices, other smart devices, or other handheld computing devices.

Figure 2A:
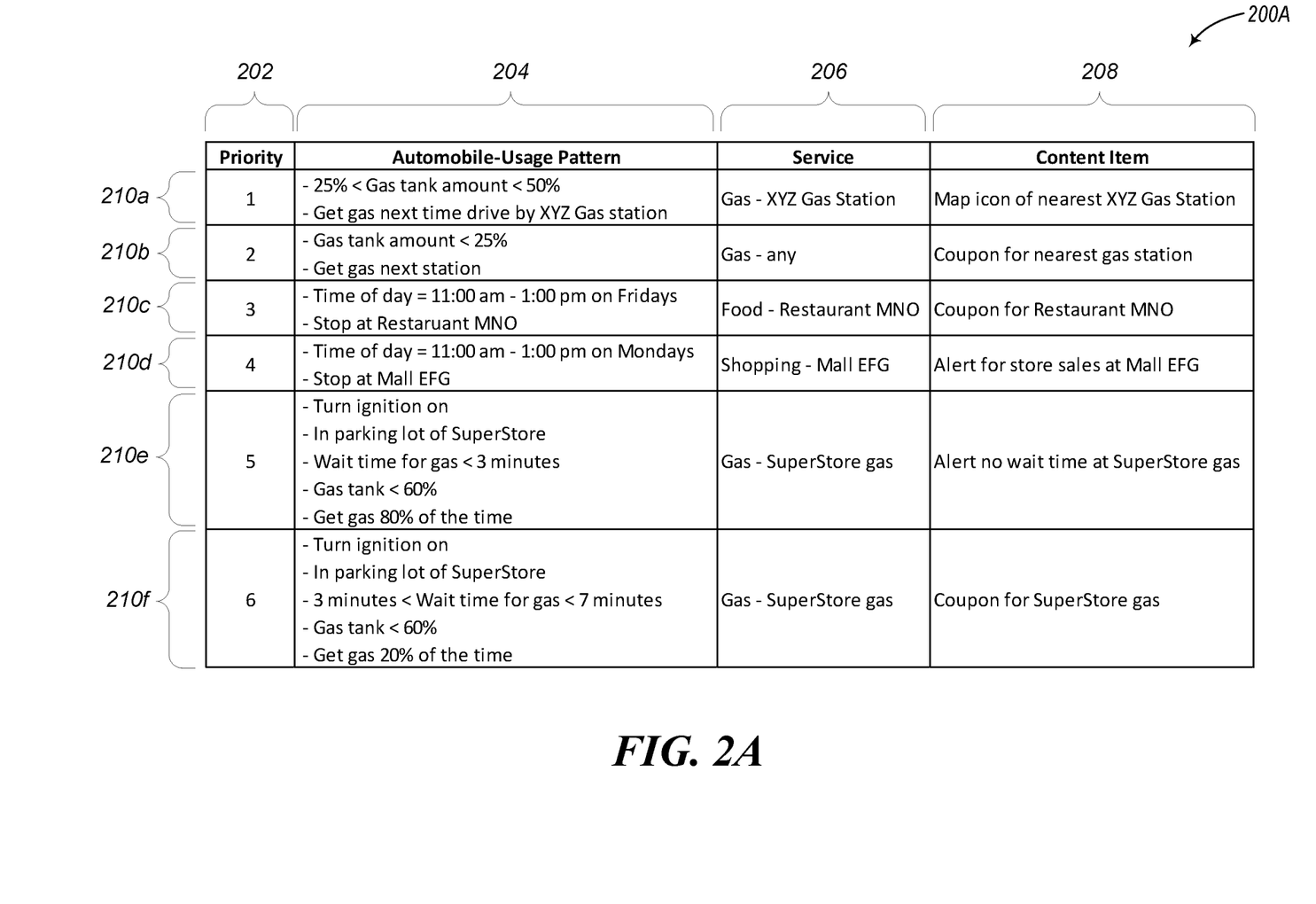
FIGS. 2A-2C show use case examples of various mappings between automobile-usage patterns and content items in accordance with embodiments described herein.
Figure 2B:
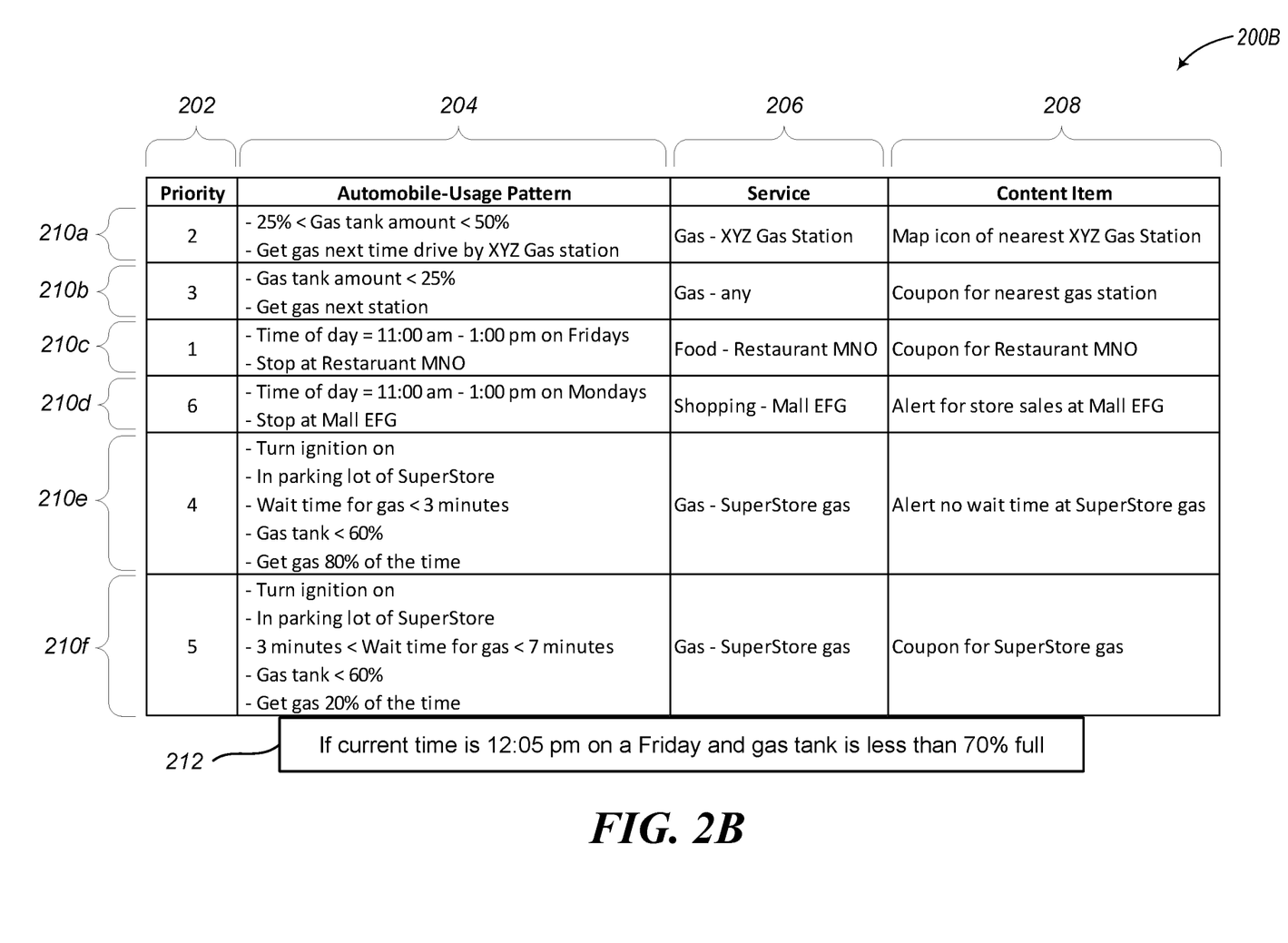
Figure 2C:
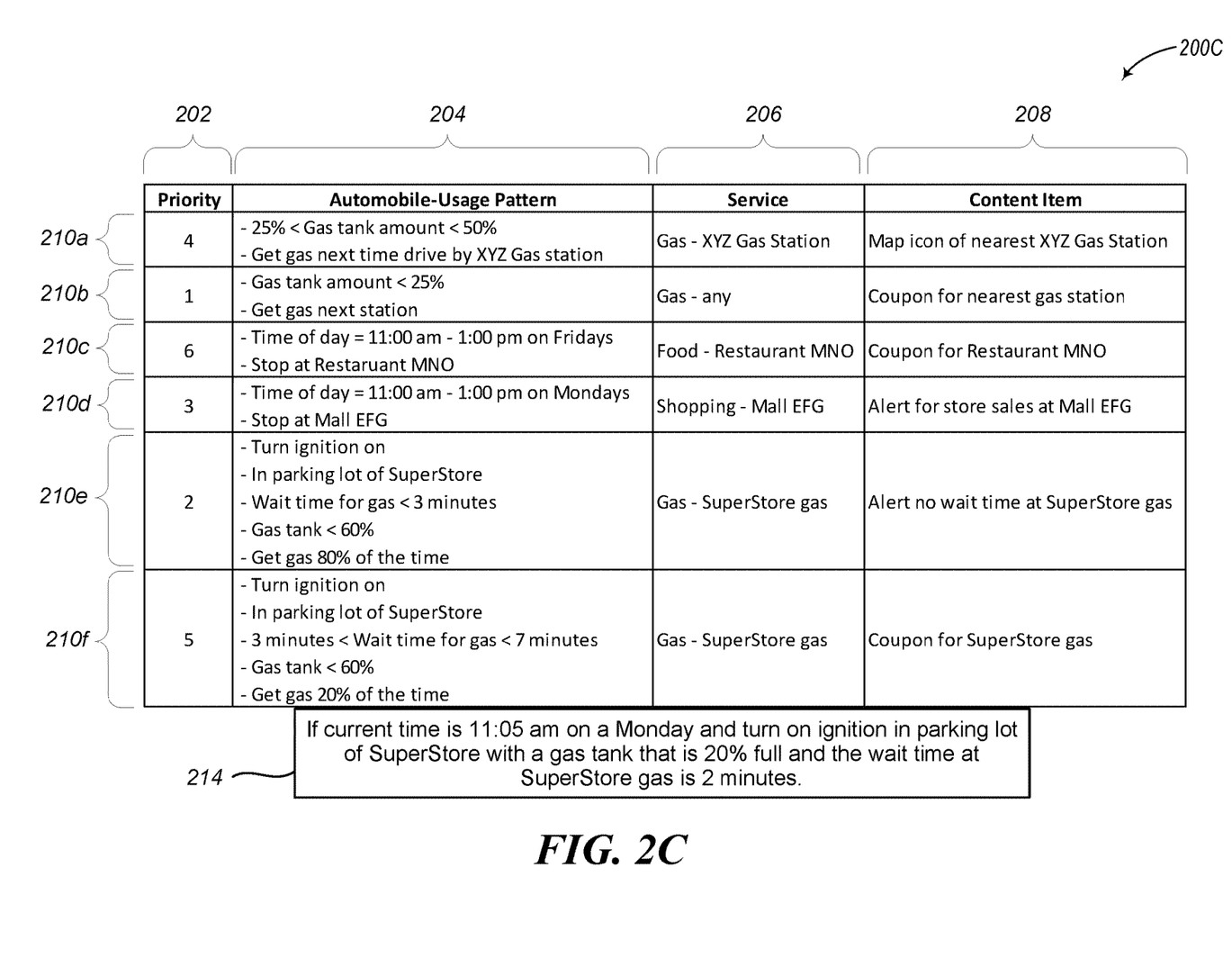

FIGS. 2A-2C show examples of various mappings between automobile-usage patterns and content items in accordance with embodiments described herein. FIG. 2A illustrates an example data structure 200A that stores mappings between automobile-usage patterns 204 and content items 208, in addition to their corresponding priorities 202.

In particular, data structure 200A stores a plurality of mappings 210a-210f between automobile-usage patterns 204 and content items 208. The mappings 210a-210f may also include the associated services 206 that map to both the automobile-usage patterns 204 and the content items 208. Moreover, each mapping 210a-210f may include a priority 202. In this example, the priorities 202 are rankings from 1-6, where 1 is the highest ranking or priority and 6 is the lowest.

As illustrated, each mapping 210a-210f includes an automobile-usage pattern 204. An automobile-usage pattern 204 may include one or more accessory data items that, when monitored over time, provide an indication of a habit of the user of the automobile. As one example, mapping 210a indicates that when the automobile gas-tank level is above 25% but lower than 50%, the user typically gets gas the next time they drive by XYZ Gas Station or at least not at this current state. An automobile-usage pattern 204 can be derived from accessory data from one or more different accessories on the automobile. Automobile-usage patterns may be derived for a particular automobile, a particular user, or a particular user of a particular automobile. In this way, embodiments described herein can be utilized to present specialized content to users in an automobile, depending on the current user of the automobile. For example, automobile-usage patterns derived for a driver-owner of an automobile may be different from the automobile-usage patterns derived for a passenger in an automobile (e.g., passenger-users of taxis or ride-share services).

Each mapping 210a-210f may include one or more content items 208 associated with the automobile-usage patterns 204. Content items 208 can include any number of audio or visual content items that can be presented to a user of the automobile. In this example, the content item associated with mapping 210a is a map icon of the nearest XYZ gas station, which can be presented to the user via a navigation accessory on the head unit.

Each mapping 210a-210f may also include one or more services 206 that are associated with the automobile-usage patterns 204 and the content items 208. These services 206 may include a generic service, a particular service, or both. For example, mapping 210a includes the generic service "gas" and the particular service "XYZ Gas Station." In various embodiments, the use of gas or gas station is just an example of a type of service, which may provide specific amenities or a range or different amenities. For example, in some embodiments, gas may refer specifically to unleaded gasoline, petrol, diesel, or other liquid fuels. In other embodiments, gas may refer to any product that provides or enables propulsion of an automobile, including liquid fuels, electricity, etc. Thus, in some embodiments, gas station may be synonymous with charging station. Similarly, gas may also be associated with other types of amenities often sold with or provided by a service. For example, gas may also include snack food, drinks, car wash, etc. Although examples described herein regarding generic and particular services are generally described with respect to gas, food, clothing, shopping, or work, other types of services may be appreciated. For example, other services may include health or medical, sports, recreation, etc. Moreover, the particular amenities provided by services may be generic, such as food, or more specific, such as Chinese food, groceries, snacks, etc.

As discussed herein, the services 206 may provide a common mapping or link between the automobile-usage patterns 204 and the content items 208. As described herein, as accessory data is received, it is compared against the automobile-usage patterns 204 to reprioritize and select content to provide to the user.

In another embodiment, confidence factors may be assigned to the mappings 210a-210f or individually to the automobile-usage pattern 204, service 206, or content item 208. For example, referring to the automobile-usage pattern 204 indicating the user typically skips the opportunity to refuel at XYZ gas station when the fuel level is above 25% but lower than 50%, an overall confidence factor may be assigned to the mapping 210a or this automobile-usage pattern 204 to reflect the uncertainty involved in this prediction. These confidence factors may influence the priority 202, with lower confidence factors tending to produce a correspondingly reduced priority 202 and higher confidence factors an increased priority 202.

FIG. 2B illustrates an example data structure 200B similar to data structure 200A in FIG. 2A, but where accessory data 212 has been received indicating that it is 12:05 pm on Friday and the gas tank is less than 70% full. In response to receiving these accessory data, the system re-prioritizes the content items 208, which re-prioritizes the mappings 210a-210f. In this example, mapping 210c, which had a priority of 3 in FIG. 2A, now has a priority of 1 because the received accessory data 212 most closely matches the automobile-usage pattern 204 for mapping 210c compared to the other mappings. Mappings 210a, 210b, 210e, and 210f are assigned priorities 2-5, respectively, because they include automobile-usage patterns 204 with the next closest matches to the received accessory data 212. This next closest match may be determined based on a partial match of automobile-usage pattern 204 or similar services 206.

Once the content items 208 are re-prioritized, one or more content items 208 may be presented to the user based on their corresponding priority 202. For example, a single content item 208 associated with mapping 210c, the highest priority 202, may be presented to the user. In other embodiments, multiple content items 208 may be presented to the user at different times, for different durations, by different output interfaces, at different levels of prominence, etc. based on their corresponding priorities. Confidence factors may also play a part in this process.

FIG. 2C illustrates yet another example data structure 200C that is similar to data structure 200B in FIG. 2B, but where the received accessory data 214 indicates that it is 11:05 am on Monday, the user has turned on the ignition in the parking lot of SuperStore, the gas tank level is 20% full, and the wait time at the SuperStore gas is 2 minutes. By employing embodiments described herein, the mappings 210a-210f are again re-prioritized based on matches between the received accessory data 214 and the automobile-usage patterns 204. In various embodiments, various machine learning and statistical modelling can be employed to determine how close a match is between the received accessory data and the automobile-usage patterns and how likely it is that the user will continue with the same pattern. The use of confidence factors is one example of such modelling. Once the content items 208 are re-prioritized, one or more content items 208 may be presented to the user based on their corresponding priority 202, which, in this example, have changed from the illustration in FIG. 2B.

In some cases, data provided to the system performing the prediction analyses and prioritizations may be from a source that is remote to the automobile and may be associated with events or states that are unrelated to the operation of the automobile. Considering the example just described, a system at the SuperStore may measure traffic at the gas pumps of the SuperStore, predict wait times for fueling based on such traffic, and publish this data in a form that is accessible by the automobile. Other events or states may include estimated wait times at restaurants (or drive-thru lanes) or other retail establishments or the availability of goods or services that may serve as the service 206. For example, a restaurant may be currently out of an item that is part of the service 206, and this state may be made available to the automobile. This data point may then affect the priority 202 of the corresponding automobile-usage pattern 204—lowering it in this case—or may simply be provided to the user without disturbing the priority 202.

The operation of certain aspects of the disclosure will now be described with respect to FIGS. 3 and 4. In at least one of various embodiments, processes 300 and 400 described in conjunction with FIGS. 3 and 4, respectively, may be implemented by or executed on one or more computing devices, such as head unit 104, mobile device 114, or remote server 124.

Figure 3:
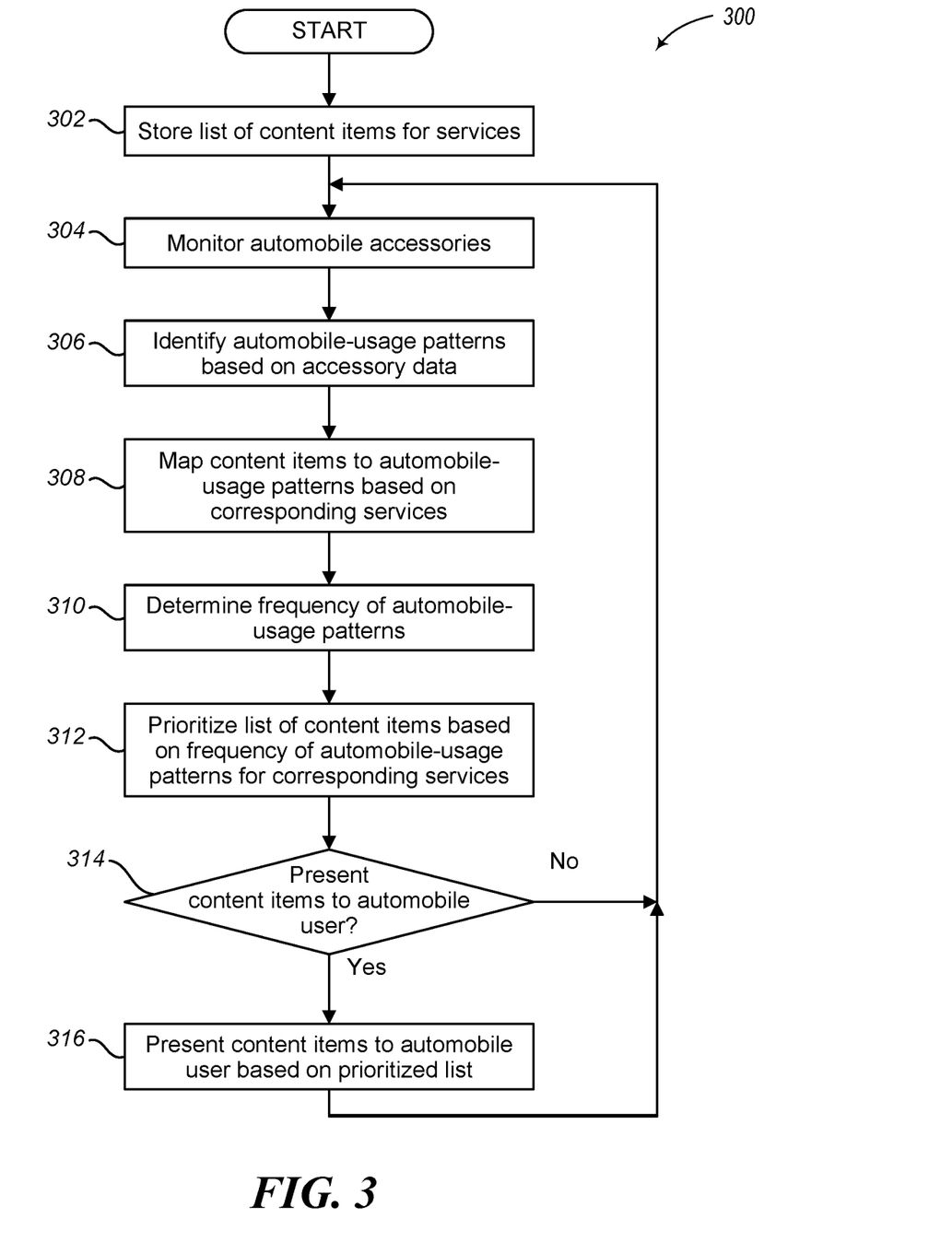
FIG. 3 illustrates a logical flow diagram generally showing one embodiment of an overview process for generating a plurality of automobile-usage patterns and a corresponding prioritized list of content items in accordance with embodiments described herein.

FIG. 3 illustrates a logical flow diagram generally showing one embodiment of an overview process for generating a plurality of automobile-usage patterns and a corresponding prioritized list of content items in accordance with embodiments described herein. This process is not necessarily limited to the chronological order shown here and may be executed without adhering to all the steps described here or with steps that are beyond those in this diagram.

Process 300 begins, after a start block, at block 302, where a list of content items is stored by the head unit or another computing device accessible to the head unit. As an example, one or more content items are associated with or mapped to a service. As discussed above, the service may be a generic service, such as gas or food, or it may be a particular service, such as Gas Station XYZ or Restaurant ABC. In some embodiments, the service for an individual content item may include a generic service, a particular service, or both. As mentioned above, the content items are audio or visual content that can include coupons, directions, hours of operation, navigation icons, or other information about the associated service.

A content item can also be a conventional icon or some other representation of a selection that when selected, causes a corresponding action to be taken. For example, pressing such an icon may cause a navigation system to launch a session directing the vehicle to an establishment or location associated with the icon. As another example, choosing the icon may activate a voice-call application for contacting an establishment or a menu of additional selections associated with the establishment.

As an option, establishments may contract with vehicle manufacturers or other third parties to have content items associated with their goods or services implemented into the solutions described here. For example, an oil company may take steps to ensure gas stations affiliated with its product are represented by conventional icons to be selectively displayed on a head unit in accordance with the concepts presented herein. As another option, the oil company may want to offer coupons or display visual content related to its affiliated stations as part of the content items. Over-the-air updates may be transmitted to the participating vehicle to update the content items to be presented.

In some embodiments, a content creator or an administrator may select the services to be associated with the content items. In other embodiments, one or more services may be selected based on textual- or graphical-image-processing techniques of the content. For example, if a content item is a coupon that says "$5 off next gas purchase at Gas Station XYZ," then text-recognition techniques can identify that this coupon is for the general service of gas and the particular service of "Gas Station XYZ."

Although content items are described as being associated with a single service, embodiments are not so limited. In some embodiments, one or more of the content items may be associated with or mapped to a plurality of services. For example, a Super Store coupon may be associated with the general services of gas, food, and shopping, as well as the particular service of "Super Store." Thus, content items can be mapped to different numbers or combinations of services.

Process 300 proceeds to block 304, where one or more automobile accessories are monitored. In various embodiments, data from a plurality of automobile accessories is monitored at select intervals. Such monitoring may occur at regular intervals, such as once per second while the automobile is being operated, or they may occur based on a select accessory value or level, or in response to other accessory data. For example, the navigation accessory can be monitored once per second to capture the movement of the automobile over time. As another example, the climate control accessory can be monitored when set to a specific temperature. As yet another example, the navigation accessory may be monitored for a current location in response to the gas-tank-gauge accessory indicating that the user has recently filled the tank. These examples are for illustrative purposes and other types of accessories may be monitored at same or different intervals.

As discussed above, the data from the automobile accessories may include physical-sensor data (e.g., gas-gauge value, gear-shift position or changes, etc.), application data (e.g., GPS location or movement, time of day, etc.), derived user data (e.g., which user is in the automobile, which user is associated with other monitored data, etc.), ephemeral data (e.g., the user's electronic calendar, the user's browsing or application usage history, etc.), or other accessory data.

Process 300 continues at block 306, where one or more automobile-usage patterns are identified based on the monitored data. In various embodiments, one or more automobile-usage patterns may be associated with or mapped to one or more services. For example, the ML models may detect a pattern indicating the user typically gets gas as soon as the tank falls below half full. As an option, a confidence factor may be assigned to this detected pattern. Once such a pattern is detected, an automobile-usage pattern may be identified and then associated with a corresponding service, such as a gas station. Similar to the content item, the services associated with the automobile-usage patterns may be generic services, such as gas or food, or it may be a particular service, such as Gas Station XYZ or Restaurant ABC, or both.

As illustrated above, in various embodiments, one or more machine-learning techniques may be applied to the monitored accessory data to identify the automobile-usage patterns. Likewise, machine-learning techniques may be employed to determine the associated service with each automobile-usage pattern. The accuracy of the ML models in use may be increased, such as by continuing to track the accessory data following a prediction and feeding the collected data back to the models. Any adjustments to such ML models may also be shared with other models, including those installed on different vehicles.

In some embodiments, the user of the automobile or an administrator may select the services to be associated with the automobile-usage patterns. In other embodiments, one or more services may be selected based on the automobile accessory that provided the data used to create an automobile usage pattern. For example, any automobile-usage pattern that includes a gas-tank level may be associated with a service associated with refueling or one or more gas stations.

Although automobile-usage patterns are described as being associated with a single service, embodiments are not so limited. In some embodiments, one or more of the automobile-usage patterns may be associated with or mapped to a plurality of services. For example, if a user typically stops at Mall MNO at noon on Saturdays, then the associated services may include food and shopping, as well as the particular service of "Mall MNO." Thus, automobile-usage patterns can be mapped to different numbers or combinations of services.

Moreover, automobile-usage patterns may be determined for a specific user, for a group of users, for the automobile in general, etc. For example, if the automobile is shared by multiple drivers in a family or work force, then the usage pattern may be determined for the automobile itself, independent of who is driving, or it may be determined based on how a particular user operates the automobile. In another example, if the automobile is a taxi or ride-share vehicle, then the usage pattern may be determined based on how the passenger-user utilizes taxi or ride-share services. For example, information from the passenger-user's mobile phone (e.g., ephemeral accessory data) may be used to determine the user's history and appointments to determine patterns. These concepts also extend to other fleet vehicles, like trucks for delivering goods or providing services to homes or businesses.

Process 300 proceeds next to block 308, where the content items in the list of content items are mapped to the automobile-usage patterns based on their corresponding services. In some embodiments, a first mapping maps the content items to the services and a second mapping maps the automobile-usage patterns to the services. The first and second mappings are correlated with one another to generate an aggregated mapping between the content items and corresponding automobile-usage patterns based on same or similar service.

In some embodiments, there may be a one-to-one relationship between a content item and an automobile-usage pattern. In other embodiments, there may be a one-to-many or many-to-one relationship between content items and automobile-usage patterns depending on the types and numbers of services associated with the content items in the first mapping and the types and number of services associated with the automobile-usage patterns in the second mapping.

The aggregated mapping may be based on an exact match of services. For example, Content_A may be mapped to Gas Station XYZ and Automobile-usage_Pattern_C may be mapped to Gas Station XYZ. In this example, Content_A is mapped to Automobile-usage_Pattern_C because they are both mapped to Gas Station XYZ.

The aggregated mapping may also be based on similar matches of services. Similar services may be identified based on one or more factors, such as, but not limited to, a common generic service, a shared address, a common owner, affiliates or related corporate entities, similar products or types of products, in a same profession, etc. For example, Content_B may be mapped to the service gas and Automobile-usage_Pattern_C may be mapped to the service Gas Station XYZ. In this example, Content_B is mapped to Automobile-usage_Pattern_C because they are both mapped to the more general category of gas. As another example, Content_C may be mapped to the service Store_ABC and Automobile-usage_Pattern_D may be mapped to the service Store_DEF. If the physical structures for the services Store_ABC and Store_DEF are in a same strip mall, such as having a shared address with different unit numbers, then Content_C may be mapped to Automobile-usage_Pattern_D because they are mapped to similar services.

Process 300 continues next at block 310, where a frequency of automobile-usage patterns is determined. In various embodiments, the frequency may be time-based, such as once a month or once a week. In other embodiments, the frequency may be accessory-data based, such as 80% of the time the gas tank falls below half, the user gets gas at Gas Station XYZ. In yet other embodiments, the frequency may be based on a number of times the automobile is driven or turned on or off or how may miles it travels, etc. These examples are provided for illustrative purposes and are not to be construed as exhaustive or limiting.

Moreover, the frequency may be determined based on different combinations of the time-based approach, the accessory-data approach, the automobile usage characteristics, or other factors. In one such example, the frequency may be the user gets gas at Gas Station XYZ 80% of the time the gas tank falls below half, but only once a month. These additional combinations of factors can indicate additional information that is not identifiable from the accessory data itself. For example, by only filling the gas tank once a month may indicate that the user is on a fuel budget for the month, regardless of the level of fuel. Thus, the user may not want to see an advertisement for a gas station if they already filled up that month. Thus, as discussed herein, content items can be targeted for the user based on the automobile-usage patterns and determined frequency.

The patterns and frequency of use can be detected via one or more different ML models in accordance with descriptions presented above. In addition, ML models can be implemented on automobile-usage data for a particular user, geographic or demographic area, or other groupings of users to identify patterns based on large aggregated data sources. Such ML models and techniques may result in advanced, subtle pattern detection that is otherwise not possible.

Process 300 proceeds to block 312, where the list of content items is prioritized or ranked based on the frequency of automobile-usage patterns for the corresponding services. In various embodiments, the aggregated mapping generated at block 308 is utilized to determine the mappings between content items and automobile-usage patterns and their corresponding frequencies. In various embodiments, the more frequent an automobile-usage pattern occurs, the higher the priority of the correspondingly mapped content item. Conversely, the less frequent an automobile-usage pattern occurs, the lower the priority of the correspondingly mapped content item. Confidence factors may also influence this ranking.

Process 300 continues at block 314, where a determination is made whether one or more of the content items in the prioritized list are to be presented to a user of the automobile. In some embodiments, the content is presented to the user at select times, such as at select times of the day. In other embodiments, the content is presented to the user in response to select actions associated with the automobile, such as when the user turns on the automobile or after five minutes of driving. In yet other embodiments, the content is presented to the user in response to accessory data matching an automobile-usage pattern or particular service, which is discussed in more detail below in conjunction with FIG. 4. If one or more content items are to be presented to the user, process 300 flows to block 316; otherwise, process 300 loops to block 304 to continue monitoring automobile accessories and possibly other data for automobile-usage patterns. Any new or modified automobile-usage patterns or their frequencies can then be used at block 312 to re-prioritize the list of content items.

At block 316, one or more of the content items are presented to a user of the automobile based on the prioritized list of content items. In some embodiments, a highest priority item is presented to the user first, followed by a second highest priority item, and so on. In other embodiments, an amount time in which a content item is presented to the user is adjusted based on the priority, such that higher priority content items are presented for a longer time than lower priority content items.

In yet other embodiments, the prominence in which the content items are presented to the user may be based on the priority of the corresponding content items. For example, assume there are two content items that are navigation icons to advertise different gas stations. Navigation icons representing the stations may be placed on a map displayed by the navigation accessory, indicating a location of each gas station. But the map may be further modified to include a route to the higher priority gas station. In this way, the higher priority content item is presented to the user in a more prominent way, while simultaneously presenting the lower priority content item.

In another arrangement, a listing of conventional icons on a display of the head unit may be reordered based on changing priorities. For example, a conventional icon representing a brand of fuel may be positioned in a row or column of icons symbolizing other services, like a coffee shop or fast-food restaurant. As the fuel level of the automobile decreases, the icon associated with the brand of fuel may incrementally move closer to the left of the display (if in a row of icons) or the top of it (if in a column). As the fuel level continues to decrease, the fuel icon may eventually be displayed in the first or top position of the arrangement of icons, correspondingly intensifying the prominence of this icon. Adjusting the presentation of the fuel-brand icon in such a manner enables the user to quickly launch the icon and initiate some form of assistance, like providing a navigation route to the closest station or providing its hours of operation or contact information. If the user replenishes the automobile's gas tank, this change in status can result in the fuel-brand icon assuming a less prominent position in the arrangement of icons.

As another example of this concept, the icon whose position may be altered based on priority may be a generic symbol representing a category of goods or services (or both). In the example presented above, the icon may represent multiple brands of fuel, and if the user selects it, the form of assistance may be determined by one or more factors, like proximity or economics. For example, the navigation route may direct the user to the nearest gas station, without regard to its brand, or the station offering the lowest prices within a certain range of the automobile. This principle may apply to many other services, like restaurants or vehicle-repair centers.

This process also assists the system in complying with any restrictions in place to reduce distracted driving. In particular, displaying the fuel-brand icon in a prominent position as fuel level becomes a concern reduces the amount of time a driver's eyes are diverted from the road and minimizes lane exceedences, a condition in which the automobile's tires move outside the automobiles corresponding lane markers. In many cases, the driver's selection of an icon conspicuously positioned based on this process requires a single glance lasting less than two seconds (or one second or less), metrics that are far safer than those required for interacting with existing features in the automobile's cabin, like a radio.

In some embodiments, the presentation of content items can be visual, such as the display of visual content on a display of the head unit of the automobile. In other embodiments, the presentation of content items can be audible, such as speech output via a speaker in the automobile. In various embodiments, the presentation of content items may be a combination of visual and audible content. Moreover, the visual or audible presentation of content items may be another way to accommodate for different priorities of the content items. For example, a higher priority content item may include both a visual and audible presentation, such as an icon on the navigation map and an audible output indicating the hours of operation, whereas the lower priority content item may be only presented visually as a banner that is displayed on the head unit for a select period of time.

After block 314, process 300 loops to block 304 to continue monitoring automobile accessories for automobile-usage patterns. Any new or modified automobile-usage patterns or their frequency can then be used at block 312 to re-prioritize the list of content items, which can be used to present the content items according to the re-prioritized list.

Figure 4:
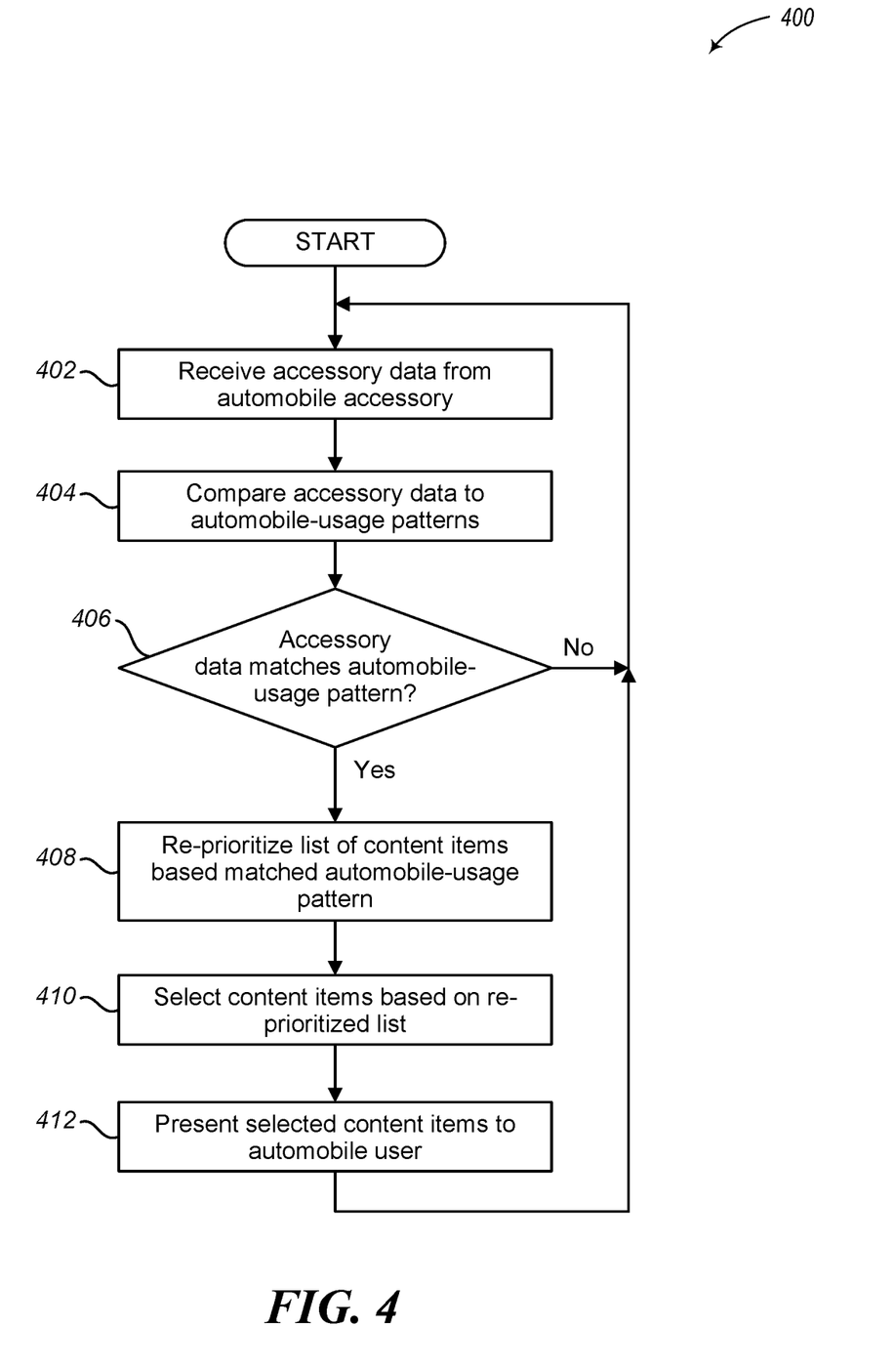
FIG. 4 illustrates a logical flow diagram generally showing one embodiment of a process for selecting and presenting prioritized content items to a user in an automobile in accordance with embodiments described herein.

FIG. 4 illustrates a logical flow diagram generally showing one embodiment of a process for presenting prioritized content items to a user in an automobile in accordance with embodiments described herein. This process is not necessarily limited to the chronological order shown here and may be executed without adhering to all the steps described here or with steps that are beyond those in this diagram.

Process 400 is similar to process 300 of FIG. 3, but here, the automobile-usage patterns have already been identified and (possibly) stored in a database. Process 400 begins, after a start block, at block 402, where accessory data is received from one or more automobile accessory. Examples of accessory data may include, but are not limited to, time of day, current location, previous driving pattern (e.g., last five minutes or last 10 kilometers), gas-tank level, driving speed, braking history, etc. In various embodiments, accessory data is received with the one or more automobile accessories is being monitored, similar to what is described at block 304 in FIG. 3. As previously described, other forms of data, such as those from sources external to the automobile, may also be received.

Process 400 proceeds to block 404, where the accessory data is compared to the automobile-usage patterns identified at block 306 in FIG. 3. In various embodiments, the head unit, or other computing device, maintains a database of automobile-usage patterns that have been previously identified. The received accessory data can then be compared against the information in the database to determine if the received accessory data matches one or more of the automobile-usage patterns. The database may be updated by adding new automobile-usage patterns or modifying or deleting existing ones.

Process 400 continues at decision block 406, where a determination is made whether there is a match between the received accessory data and one or more of the automobile-usage patterns. For example, if the received accessory data indicates that the current fuel-tank level is 18% and an automobile-usage pattern predicting a high probability that the user gets gas at a next available gas station when the fuel tank is under 25%, then there is a match.

In some embodiments, there may be more than one match between the received accessory data and the automobile-usage patterns. For example, assume the received accessory data indicates that the current fuel-tank level is 18%, and it is 12:20 pm on a Friday. In this example, there may be a match to one automobile-usage pattern indicating that the user gets gas at a next available gas station when the fuel tank is under 25% and a second automobile usage pattern indicating that the user stops at Restaurant ABC on Fridays between 12:00 pm and 1:00 pm. Because at least a portion of the received accessory data matches each of these two automobile-usage patterns, then there is a match between the received accessory data and multiple automobile-usage patterns.

If there is a match between the received accessory data and at least one automobile usage pattern, then process 400 flows to block 408; otherwise, process 400 loops to block 402 to continue monitoring and receiving automobile accessory data.

At block 408, the list of prioritized content items, generated at block 312 in FIG. 3, is re-prioritized based on the matched automobile-usage patterns. In various embodiments, the priority of the content items that map to the matched automobile-usage patterns is increased, while the priority of the content items that map to the unmatched automobile-usage patterns is decreased. In this way, content items associated with the matched automobile-usage patterns have a higher priority than content items associated with unmatched automobile-usage patterns.

In some embodiments, the priority order of the content items that are mapped to the matched automobile-usage patterns is maintained relative to one another. For example, assume Content_B has a higher priority than Content_A, where Content_A is mapped to Automobile-usage_Pattern_A and Content_B is mapped to Automobile-usage_Pattern_B. If both automobile-usage patterns match the received accessory data, then Content_B and Content_A may be moved the to the highest priority items in the list, but Content_B maintains a higher priority than Content_A. In this way, the re-prioritized list is based on the frequency of use and the urgency or relevancy to the current accessory data.

In some embodiments, content providers may be enabled to buy or bid on a priority level. For example, a content provider may pay to have its content items remain above a select priority threshold, even if they are not mapped to a matched automobile-usage pattern. This allows for content providers that are in the same or similar services to bid on whose content has a higher priority. Similarly, such bidding can allow content providers that are in different services to have priorities that are influenced by the amount of the bid, independent of the frequency of the associated automobile-usage patterns.

In some embodiments, the priority of the content items may be based on the user associated with the automobile-usage pattern that matches the accessory data. For example, in a ride-share service or vehicle, at least some of the accessory data may be from the mobile phone of a passenger-user. Accordingly, content specialized for that user can be prioritized or ranked higher than other content. But when that passenger-user exits the ride-share vehicle, then content associated with the vehicle itself or the driver may have a higher priority or rank.

In some embodiments, block 408 may be optional and may not be performed; rather content associated with the matched automobile pattern may be selected (at block 410) and presented to the user (at block 412). In this way, specific content may be provided to the user independent of the prioritization of the plurality of content items.

Process 400 proceeds to block 410, where one or more content items are selected based on the re-prioritized list. In some embodiments, only those content items associated with the matched automobile-usage patterns are selected. In other embodiments, only a select number of content items are selected, such as the one or two highest priority content items. In yet other embodiments, content items above a select priority threshold are selected. In still other embodiments, all content items in the re-prioritized list are selected.

Process 400 continues at block 412, where the selected content items are presented to the automobile user based on the prioritized list of content items. In various embodiments, block 412 presents the selected content items similar to block 316 in FIG. 3 and the examples described in relation to process 300. For example, a higher priority selected content item may be presented longer or in a different manner than a lower priority selected content item. After block 412, process 400 loops to block 402 to continue monitoring and receiving automobile accessory data.

As noted earlier, input to the system is not limited to data from automobile accessories. For example, some retailers may provide data relating to wait times or the availability of certain goods or services, and this information can be used in prioritizing content items. As another option, restrictions on the operation of a vehicle or the user may also be considered. In particular, the owner of the vehicle or the user may be under a contractual obligation to use the services of only certain vendors, and content items associated with these vendors may be correspondingly prioritized. In contrast, content items related to vendors with whom the owner or user is not contractually obligated to use the vendors' services may be assigned lower priorities. As a specific example, the owner of a fleet of vehicles may enter into an agreement with a chain of gas stations requiring the vehicles to be fueled with gas from only these stations, in exchange for lower fuel prices. The system described above would take this factor into account when prioritizing content items for presentation to the user of a vehicle in this fleet.

Figure 5:
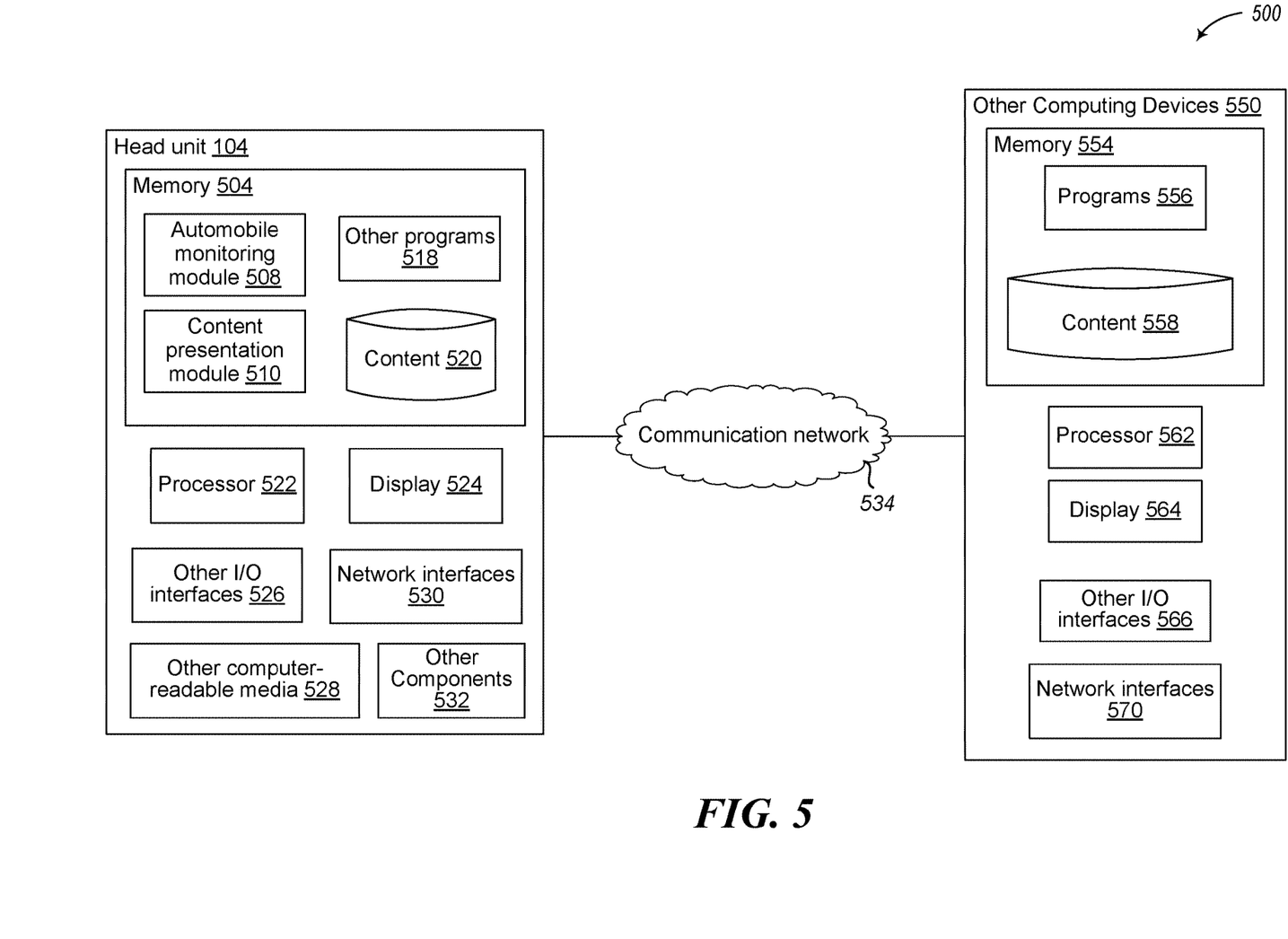
FIG. 5 shows a system diagram that describes one implementation of computing systems for implementing embodiments described herein.

FIG. 5 shows a system diagram that describes one implementation of computing systems for implementing embodiments described herein. System 500 includes head unit 104, and optionally one or more other computing devices 550.

As described herein, head unit 104 is a computing device that can perform functionality described herein for monitoring accessory data, generating automobile-usage patterns, and selecting and presenting associated prioritized content to a user. One or more special-purpose computing systems may be used to implement the head unit 104. Accordingly, various embodiments described herein may be implemented in software, hardware, firmware, or in some combination thereof. The head unit 104 includes memory 504, one or more processors 522, display 524, input/output ("I/O") interfaces 526, other computer-readable media 528, network interface 530, and other components 532.

Processor 522 includes one or more processing devices that execute computer instructions to perform actions, including at least some embodiments described herein. In various embodiments, the processor 522 may include one or more central processing units ("CPU"), programmable logic, or other processing circuitry.

Memory 504 may include one or more various types of non-volatile and/or volatile storage technologies. Examples of memory 504 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 504 may be utilized to store information, including computer-readable instructions that are utilized by processor 522 to perform actions, including at least some embodiments described herein.

Memory 504 may have stored thereon various modules, such as automobile-monitoring module 508 and content-presentation module 510. The automobile-monitoring module 508 provides functionality to monitor a plurality of accessories on the automobile by accessing and receiving data from the accessories. The automobile-monitoring module 508 may also receive data from external sources and generate automobile-usage patterns from the monitored data. The content-presentation module 510 provides functionality to prioritize content based on the automobile-usage patterns. In some embodiments, the content-presentation module 510 requests associated content from another computing device, such as other computing devices 550, which may include remote server 124 in FIG. 1. In other embodiments, the content-presentation module 510 itself selects the associated content. Once selected or received, the content-presentation module 510 provides the content to the user, such as via display 524, other components 532, or output interface 116.

Memory 504 may also store other programs 518 and other content 520. Other programs 518 may include operating systems, user applications, or other computer programs. Content 520 may include visual, audio, or tactile content to provide to the user, as described herein.

Display 524 is a display device capable of rendering visual content to a user. In various embodiments, the content selected by the content presentation module 510 is presented to the user via the display 524. The display 524 may be a liquid-crystal display, light-emitting diode, or other type of display device, and may include a touch-sensitive screen capable of receiving inputs from a user's hand, stylus, or other object.

I/O interfaces 526 may include interfaces for various other input or output devices, such as audio interfaces, other video interfaces, USB interfaces, physical buttons, keyboards, or the like. In some embodiments, the I/O interfaces 526 provide functionality for the head unit 104 to communicate with other devices or components in the automobile, such as the output interface 116 in FIG. 1. Other computer-readable media 528 may include other types of stationary or removable computer-readable media, such as removable flash drives, external hard drives, or the like.

Network interfaces 530 are configured to communicate with other computing devices, such as the other computing devices 550, via a communication network 534. Network interfaces 530 include transmitters and receivers (not illustrated) to send and receive data as described herein. The communication network 534 may include the communication network 122 or the mobile-device communication network 120 of FIG. 1.

The head unit 104 is not the only device capable of incorporating this design or being configured to perform this functionality. For example, another onboard computer or a system that is remote to the vehicle may be similarly equipped and configured.

The other computing devices 550 are computing device that are remote from the head unit 104, and in some embodiments, can perform functionality described herein for generating automobile-usage patterns from accessory data provided by the head unit or prioritizing and selecting content based on the automobile-usage patterns. The other computing devices 550 may include remote server 124, mobile device 114 in FIG. 1, or any other suitable device or system.

One or more special-purpose computing systems may be used to implement the other computing devices 550. Accordingly, various embodiments described herein may be implemented in software, hardware, firmware, or in some combination thereof.

The other computing devices 550 includes memory 554, one or more processors 562, display 564, I/O interfaces 566, and network interface 570, which may be similar to or incorporate embodiments of memory 504, processor 522, display 564, I/O interfaces 526 and network interface 570 of head unit 104, respectively. Thus, processor 562 includes one or more processing devices that execute computer instructions to perform actions, including at least some embodiments described herein. In various embodiments, the processor 522 may include one or more CPUs, programmable logic, or other processing circuitry. Memory 554 may include one or more various types of non-volatile and/or volatile storage technologies. Memory 554 may be utilized to store information, including computer-readable instructions that are utilized by processor 562 to perform actions, including at least some embodiments described herein. Memory 554 may also store programs 556 and content 558. The programs 556 may include a content-selection module, not illustrated, similar to content-presentation module 510 that selects and provides content to the head unit 104 based on information received from the head unit 104.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A system, comprising:
a memory associated with an automobile and configured to store computer instructions and a first plurality of mapping between a plurality of content items and a plurality of services for a user in the automobile;
an output interface in the automobile and configured to present content to the user in the automobile; and
a processor associated with the automobile and configured to execute the computer instructions and:
monitor accessory data from a plurality of accessories of the automobile;
identify a plurality of automobile-usage patterns based on the monitored accessory data from the plurality of accessories;
generate a second plurality of mappings between the plurality of automobile-usage patterns and the plurality of services;
generate a third plurality of mappings between the plurality of content items and the plurality of automobile-usage patterns based on the first plurality of mappings and the second plurality of mappings;
determine a frequency of use for each of the plurality of automobile-usage patterns;
prioritize the third plurality of mappings based on the determined frequencies for the plurality of automobile-usage patterns;

receive additional accessory data from at least one of the plurality of accessories;
reprioritize the third plurality of mappings based on the additional accessory data matching at least a portion of at least one automobile-usage pattern of the plurality of automobile-usage patterns;
selecting two or more content items from the plurality of content items based on the reprioritized third plurality of mappings; and
instruct the output interface to present the two or more content items to the user.

2. The system of claim 1, wherein the processor is configured to execute further computer instructions to:
receive target accessory data from one or more of the plurality of accessories;
determine if the target accessory data matches an automobile-usage pattern of the plurality of automobile-usage patterns;
select, from the plurality of content items, a content item associated with the matched automobile-usage pattern; and
present the selected content item to the user of the automobile.

3. The system of claim 1, wherein the processor is configured to present the two or more content items to the user by executing further computer instructions to:
transmit, via the output interface, the two or more content items to a head unit of the automobile for display to the user.

4. The system of claim 1, wherein the output interface is a display device and wherein the processor is configured to present the two or more content items to the user by executing further computer instructions to:
display, via the display device, the two or more content items to the user.

5. The system of claim 1, wherein the processor is configured to present the two or more content items to the user by executing further computer instructions to:
display each content item of the two or more content items in a sequential order based on a priority of each content item.

6. The system of claim 1, wherein the processor is configured to present the two or more content items to the user by executing further computer instructions to:
display a highest priority content item of the two or more content items to the user.

7. The system of claim 1, wherein the processor is configured to identify an automobile-usage pattern of the plurality of automobile-usage patterns by executing further computer instructions to:
determine a current location of the automobile via a GPS transceiver;
determine a current time of day;
determine services that are within a selected geographic area around the current location;
determine an on/off operation of the automobile; and
associating the current location, the current time of day, the determined services, and the determined on/off operation of the automobile to create the automobile-usage pattern.

8. The system of claim 1, wherein the processor is configured to further prioritize the third plurality of mappings by executing further computer instructions to:
receive, from each of a plurality of third parties, a bid for a respective content item of the plurality of content items to be associated with a priority level above a select threshold priority level; and
reprioritize the third plurality of mappings based on the bids from the plurality of third parties.

9. A method, comprising:
storing, by a head unit of an automobile, a list of a plurality of content items that are to be presented to a user in an automobile and a first plurality of mappings between the plurality of content items and a plurality of services;
monitoring, by the head unit, information from a plurality of accessories of the automobile during a first time;
identifying, by the head unit, a plurality of automobile-usage patterns that are associated with the plurality of services based on the monitored information from the plurality of accessories;
generating, by the head unit, a second plurality of mappings between the plurality of automobile-usage patterns and the plurality of services;
generating, by the head unit, a third plurality of mappings between the plurality of content items and the plurality of automobile-usage patterns based on the first plurality of mappings and the second plurality of mappings
determining, by the head unit, a frequency of use during the first time for each of the plurality of automobile-usage patterns;
prioritizing, by the head unit, the third plurality of mappings based on the determined frequencies of the plurality of automobile-usage patterns for the plurality of services;
monitoring, by the head unit, additional information from at least one of the plurality of accessories during a second time;
reprioritizing, by the head unit, the third plurality of mappings based on the additional information matching at least a portion of at least one automobile-usage pattern of the plurality of automobile-usage patterns;
selecting, by the head unit, two or more content items from the plurality of content items based on the reprioritized third plurality of mappings; and
presenting, by the head unit, the two or more content items to the user.

10. The method of claim 9, further comprising:
receiving, by the head unit, target information from one or more of the plurality of accessories;
determining, by the head unit, if the target information matches an automobile-usage pattern of the plurality of automobile-usage patterns;
selecting by the head unit and from the plurality of content items, a content item associated with the matched automobile-usage pattern; and
presenting, by the head unit, the selected content item to the user of the automobile.

11. The method of claim 9, wherein presenting the two or more content items includes:
displaying, by the head unit, the two or more content items to the user via a display device.

12. The method of claim 9, wherein presenting the two or more content items includes:
displaying, by the head unit, each content item of the two or more content items in a sequential order based on a priority of each content item.

13. The method of claim 9, wherein presenting the two or more content items includes:
displaying, by the head unit, a highest priority content item of the two or more content items to the user based on the prioritized list.

14. The method of claim 9, wherein the identifying an automobile-usage pattern of the plurality of automobile-usage patterns includes:
- determining, by the head unit, a current location of the automobile via a GPS transceiver;
- determining, by the head unit, a current time of day;
- determining, by the head unit, services that are associated with the current location; and
- associating, by the head unit, the current location, the current time of day, and the determined services to create the automobile-usage pattern.

15. A head unit of an automobile, comprising:
- a display device that is configured to display content;
- a memory that is configured to store computer instructions, a plurality of content items, and a first plurality of mappings between the plurality of content items and a plurality of services; and
- a processor that is configured to execute the computer instructions and:
  - monitor accessory data from a plurality of accessories of the automobile during a first time period;
  - identify a plurality of automobile-usage patterns for the first time period based on the monitored accessory data from the plurality of accessories;
  - generate a second plurality of mappings associating the plurality of automobile-usage patterns with the plurality of services;
  - generate a third plurality of mappings associating each of the plurality of content items with a respective automobile-usage pattern of the plurality of automobile-usage patterns based on the first plurality of mappings and the second plurality of mappings and respective services that are common to both a content item and the respective automobile-usage pattern;
  - prioritize the third plurality of mappings based on a usage amount of the associated plurality of automobile-usage patterns;
  - receive target accessory data from at least one of the plurality of accessories during a second time period;
  - reprioritize the third plurality of mappings based on the target accessory data;
  - determine if the target accessory data matches an automobile-usage pattern of the plurality of automobile-usage patterns;
  - select, based on the reprioritized third plurality of mappings, the content item associated with the matched automobile-usage pattern; and
  - present, via the display device, the selected content item to the user of the automobile.

16. The head unit of claim 15, wherein each of the plurality of automobile-usage patterns includes two or more automobile characteristics that occurred concurrent or sequential to one another.

17. The head unit of claim 16, wherein the two or more automobile characteristics of each automobile-usage pattern includes a current gas gauge amount, a time of day, an amount of time travelling, a current location, a location where the automobile stopped, a location where the automobile turned on.

* * * * *